Oct. 16, 1962 — W. C. FULLER ETAL — 3,058,784
COMBINATION HANDLE AND TOOL
Filed Dec. 28, 1959
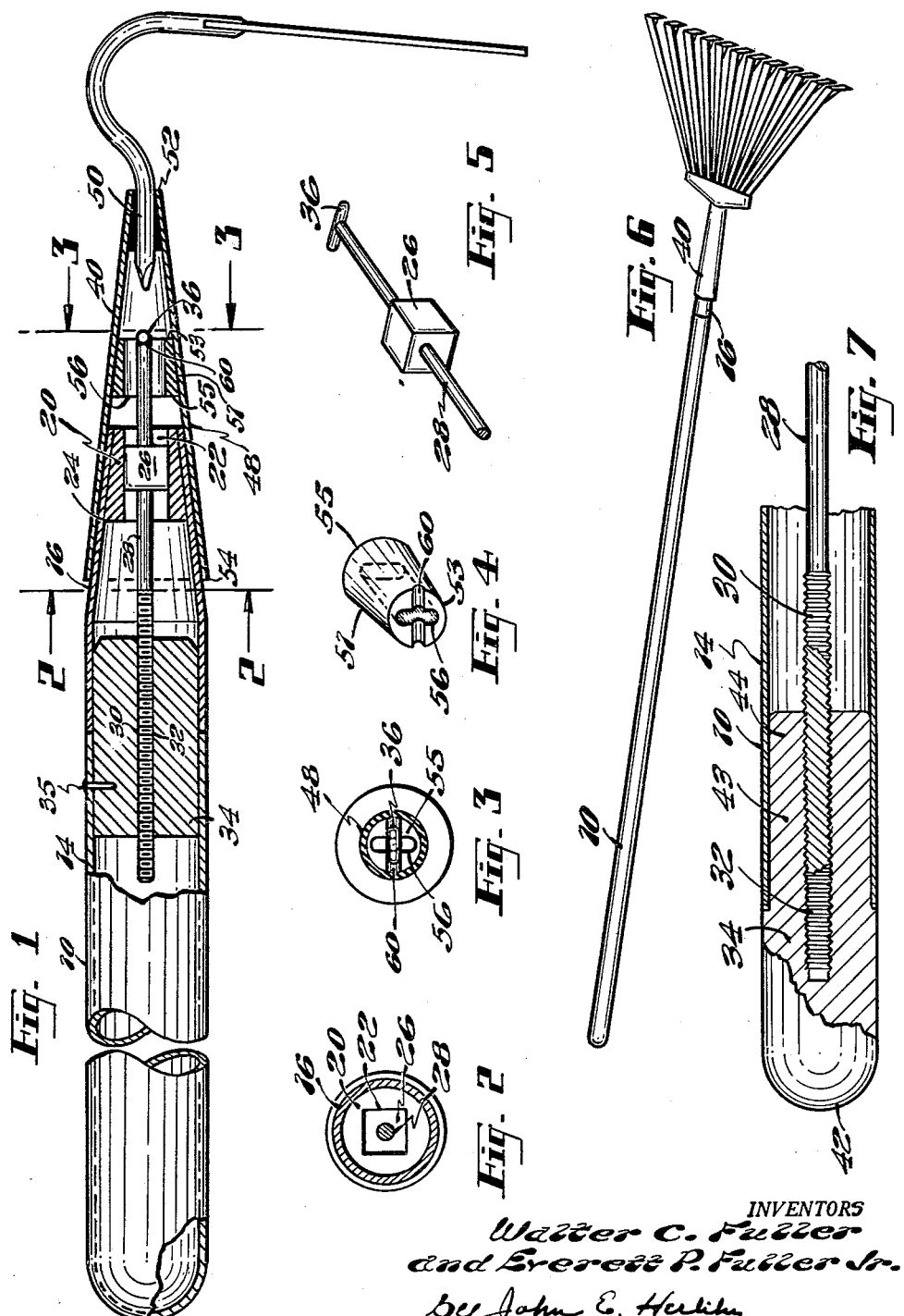
INVENTORS
Walter C. Fuller
and Everett P. Fuller Jr.
by John E. Herlihy
Attorney

United States Patent Office 3,058,784
Patented Oct. 16, 1962

3,058,784
COMBINATION HANDLE AND TOOL
Walter C. Fuller, 9 Oakridge Road, North Quincy, Mass., and Everett P. Fuller, Jr., 41 Tyler St., Hyde Park, Mass.
Filed Dec. 28, 1959, Ser. No. 862,347
4 Claims. (Cl. 306—1)

This invention relates to the combination of a handle and tool adapted to be attached to or removed from the handle so that a series of tools, such as a garden hoe, rake, grass cutter, snow plow, ice chopper, broom, mop, floor squeegee, or paint roller, or any of a wide variety of tools may be desirably attached to the same handle as the tool is required for any given job.

The objects of the invention are:

First: to provide a handle having an end to which a series of tools may be successively attached.

Second: to provide a handle, the ends of which are formed for the reception of tools of different character.

Third: to provide a latch for attaching a tool to the handle.

Fourth: to provide a simple and efficient structure of a handle and complementing tool member therefor.

Other objects will be set forth hereinafter or will be apparent from the description and the drawings, in which is illustrated an embodiment exemplifying the invention.

The invention, however, is not intended to be restricted to any particular tool or any particular tool-handle combination, as any of a wide variety of tool members may be substituted and replaced on the same handle, that being the principal purpose of the invention. Accordingly, the exemplifying embodiments herein shown and described are intended only to be illustrative and for the purpose of complying with the requirements of statute for the disclosure of operative embodiments.

Reference to the accompanying drawings, which illustrate the preferred embodiment of our invention, will facilitate an understanding of our contribution to the art.

FIGURE 1 is a sectional view of the handle shown in part broken away and shown attached to the tool member, in which a hoe is the tool of the tool member.

FIGURE 2 is a cross-section of the handle along line 2—2 of FIGURE 1.

FIGURE 3 is a cross-section of the tool member along line 3—3 of FIGURE 1.

FIGURE 4 is a perspective view of the inner nose-piece of the tool member, through which the spindle passes and seats in a concave seat after 90° turn.

FIGURE 5 is a perspective view of the section of shaft from line 2—2 forward, showing the key member and the square shaft-support member.

FIGURE 6 is a perspective view of a handle with a grass rake attached thereto.

FIGURE 7 is a sectional view of an alternate handle construction in which the shaft extension control means is at the handle end.

Referring to the drawings, a substantially cylindrical handle 10 of convenient length and preferably between 2' and 10' in length is made of a substantially hollow, preferably thin-walled, tubular, light-weight material such as aluminum or other light-weight metal or alloy or a resilient plastic material. This tubular structure is preferably of from 1" to 1½" in diameter in its main section 14 and is drawn down approximately 6" from one end to provide a truncated conical end section 16 having a terminating diameter of approximately ¾"; a terminating bushing 20 which is provided with an aperture 22 extending therethrough is attached to the inner sidewall 24 of the conical end section 16. Aperture 22 is preferably of polygonal cross-section, so that a shaft support member 26, which is of similar cross-sectional shape may be inserted in the aperture, thus the shaft support member may move freely axially yet not rotatably within the aperture. A shaft 28 is held by the shaft support member 26 and extends into the handle 10 and is terminated in the threaded end section 30. The threaded section 30 of shaft 28 engages a complementary threaded section 32 of a shaft engagement member 34, the latter being held fast to the handle by any suitable means such as the key 35, which is shown in FIGURE 1.

The end of the shaft 28 opposite the threaded section 30 is provided with a key member 36 which provides a means for engaging the shaft and a tool member 40. The key member 36 is shown more clearly in FIGURE 5 and it consists of a metallic rod which is welded or otherwise attached to shaft 28. Accordingly, when the key member 36 is held and prevented from rotating and the handle 10 is turned, the shaft 28 and its support member 26 move lineally with respect to the main body of the handle, and the shaft is elongated or contracted with respect to the handle itself, depending on the direction of rotation of the handle.

Another embodiment of the handle of our invention is shown in FIGURE 7. In this embodiment the shaft engagement means 34 is situated substantially at the handle end 42 and is fastened to the handle end 42. The handle end 42 is separated from the remainder of the handle 10 and the extension of the shaft engagement means 43 into the handle 10 provides a hub 44 permitting the handle end 42 to rotate independently of handle 10 and thereby extending or withdrawing shaft 28 with respect to the handle 10 for the purpose of engagement with tool member 40.

As is shown in FIGURES 1 and 2, aperture 22 and shaft support member 26 are illustrated as being substantially rectangular in shape. Of course, other polygonal shapes such as triangular, hexagonal, or even a curvilinear shape could be used.

Tool member 40 consists of an outer hollow cone 48 with an open end or base 54. The cone is shaped to receive the conical section 16 of handle 10 and is provided with means 50 at the apex 52 for fastening the tool to the cone. The tool fastening means as is shown in FIGURE 1 comprises a metallic weld. However, various means of riveting or bolting the tool in position could be substituted for the weld shown.

Attached interally of cone 48 is a means 51 for engaging the key member 36 of the handle. As is shown in FIGURES 1, 3 and 4 this key engagement means 51 consists of a truncated metallic conical bushing with end surfaces 55 and 53, which are substantially perpendicular to the axis of the cone 48. The longer end surface 55 is preferably positioned at not more than half the distance from the apex 52 to the base 54 of the cone 48. A key-way 56 is provided in the bushing 51 and is of sufficient size and shape to permit key member 36 to pass through. As is shown in FIGURES 3 and 4, a concave section 60, of the end surface 53 is disposed angularly with respect to the key-way 56 and provides an arresting surface for the key member 36. Thus, when the key is inserted in the key-way and the shaft 28 is drawn up tight by rotation of the handle, the key is arrested in the slot or concave section 60 and the conical section 16 engages the inner sidewalls of hollow cone 48 to provide a union between the handle and tool member and thereby permit the combination handle and tool of our invention to be used for the purposes intended.

Other locking means for key member 36 could be used satisfactorily in lieu of the bushing member 51. For example, a pair of spaced-apart parallel rods preferably having means for arresting the key in position could be attached to the cone at the desired distance from the apex and could be used in place of the bushing. We prefer the bushing, however, because it provides a more stabilized locking means for the tool member 40.

In operation the shaft 28 is extended by turning the handle 10 (or the handle end 42) while the shaft is held to prevent rotation. While in the extended position, the handle is inserted into the tool member 40 so that the key 36 extends through the key-way 56. The tool member is adjusted so that the key 36 engages the arresting concave surfaces 60, and the handle is turned to withdraw the shaft 28 into the handle, and thereby stabilize the union between handle and tool member through the contacting conical walls of the handle and tool member and the key and arresting surface of the bushing. To remove the tool member, the shaft 28 is again extended, the tool member 40 is turned so that the key 36 can be withdrawn from the key-way 56.

While the drawings show that our invention may be used with a hoe, FIGURE 1, and a rake, FIGURE 6, any of a wide variety of other tools can also be used and the same handle can be used or adapted for use with any of the tools which are constructed for use with the handle. Among such other tools which could be substituted for the rake and hoe shown are a brush, a squeegee, a paint roller, a shovel, a cultivator, a grass-edger, a floor mop and many others. This, of course, will be apparent to those skilled in the art, and are therefore included within the scope and intent of the invention herein disclosed.

Having thus disclosed the invention, we claim:

1. The combination of a tool member including handle attachment and detachment means and a handle therefor, said tool member having a substantially hollow conical sleeve, a tool, means for holding the tool at the apex of the conical sleeve, sleeve walls extending rearwardly and conically outwardly from the apex and terminating with an open end, and a shaft key engagement means disposed internally of said conical walls said handle adapted to engage said tool member, said handle being provided with a substantially hollow elongated member having one end terminating in an open end substantially conical truncated segment conforming substantially with the internal sleeve walls of the tool member, a shaft supported axially within said elongated member and extending outwardly through the open end thereof, means within said elongated member for selectively extending said shaft from and withdrawing said shaft into said elongated member, and a key member fastened to the outward extremity of said shaft cooperating with the key engaging means.

2. The combination of a handle and tool fastening means which comprises a substantially conical sleeve, means for holding a tool at the apex of said sleeve, means within the conical sleeve for mechanically engaging a handle, said last mentioned means including a bushing provided with a slotted key-way and grooved surface on the end thereof nearest the sleeve apex, said grooved surface being angularly disposed with respect to the key-way, and internal conical sleeve walls extending from the bushing and away from the apex of the sleeve a distance of at least the distance between the apex and the bushing, said handle for the foregoing comprising an elongated member which terminates in a truncated, substantially conical hollow segment conforming substantially with the internal conical sleeve walls extending beyond the bushing, a shaft supported internally of the elongated member and extending outwardly therefrom through the truncated conical sleeve and terminating in a key fitting the slotted key-way and grooved surface, and means internally of the handle for selectively telescopically extending and contracting said shaft with respect to said handle.

3. The combination of a handle and tool fastening means which comprises a substantially conical sleeve, means for holding a tool at the apex of said sleeve, means within the conical sleeve for mechanically engaging a handle, said last-mentioned means including a bushing provided with a slotted key-way and grooved surface on the end thereof nearest the sleeve apex, said grooved surface being angularly disposed with respect to the key-way, and internal conical sleeve walls extending from the bushing and away from the apex of the sleeve a distance at least the distance between the apex and the bushing, said handle for the foregoing comprising an elongated member which terminates in a truncated, substantially conical segment conforming substantially with the internal conical sleeve walls extending beyond the bushing, a spacer member positioned within said conical segment and provided with an aperture which extends through the spacer, a shaft support member of shape and size as to permit axial movement of the same within the aperture, a shaft held by and extending through said shaft support member and extending outwardly from the handle, a key-member attached to the shaft at the outward extension thereof cooperating with said key-way and grooved surface, and means for selectively extending or contracting the outward extension of said shaft with respect to said handle.

4. As an article of manufacture for a combination detachable handle and tool, a tool member which comprises a substantially conical sleeve, means for holding a tool at the apex of said sleeve, means within said conical sleeve for mechanically engaging a handle, said last-mentioned means including a bushing provided with a slotted key-way therethrough, a grooved surface angularly disposed with reference to the key-way, and means for fastening the bushing to the internal surfaces of the conical sleeve so that the grooved surface is adjacent the apex of the sleeve, and an internal conical sleeve wall extending from the bushing and away from the apex at least the distance between the apex and the bushing.

References Cited in the file of this patent

UNITED STATES PATENTS

| | | |
|---|---|---|
| 430,821 | Baxter | June 24, 1890 |
| 789,021 | Hartman | May 2, 1905 |
| 939,019 | Hartwell | Nov. 2, 1909 |
| 1,398,342 | Pleaue | Nov. 29, 1921 |
| 1,788,565 | Davis | Jan. 13, 1931 |
| 2,632,489 | Johnson | Mar. 24, 1953 |